United States Patent [19]

Meunier

[11] 4,323,384
[45] Apr. 6, 1982

[54] PREHEATER FOR COMPACTED VITRIFIABLE MATERIAL

[75] Inventor: Georges Meunier, Boulogne, France

[73] Assignee: Isover Saint-Gobain, Neuilly sur Seine, France

[21] Appl. No.: 172,232

[22] Filed: Jul. 25, 1980

[30] Foreign Application Priority Data

Jul. 27, 1979 [FR] France .................... 79 19445

[51] Int. Cl.³ .............................. C03B 3/00
[52] U.S. Cl. ........................ 65/335; 65/27; 432/17; 432/69; 432/70
[58] Field of Search .............. 65/335, 27; 432/17, 432/69, 70

[56] References Cited

U.S. PATENT DOCUMENTS

| | | | |
|---|---|---|---|
| Re. 29,622 | 5/1978 | Lange | 65/27 |
| 3,172,648 | 3/1965 | Brichard | 65/335 X |
| 3,320,045 | 5/1967 | Weiss et al. | 65/335 |
| 3,607,190 | 9/1971 | Penberthy | 65/335 X |
| 3,832,128 | 8/1974 | Paul | 432/17 |
| 3,953,190 | 4/1976 | Lange | 65/335 |
| 4,248,616 | 2/1981 | Seng et al. | 65/335 |

FOREIGN PATENT DOCUMENTS 1362447 4/1964 France .
2425408 7/1979 France .

Primary Examiner—Arthur D. Kellogg
Attorney, Agent, or Firm—Pennie & Edmonds

[57] ABSTRACT

A preheater in the form of a vertical column for treating a vitrifiable composition introduced into the column at the top and which moves through the column by the force of gravity. The vitrifiable composition, which ultimately moves from the column to feed a glass-smelting furnace is treated through heat exchange with hot gases from a regenerator or recuperator of the smelting furnace which move upwardly through the column, against the flow of the vitrifiable composition. An element is located within the column to form a mixing chamber for hot gases within the region of the element and an upper sloping alignment of the vitrifiable composition which takes shape below the element, as well as to provide means for decelerating movement of the vitrifiable composition within the region of the axis of the column so that movement of the vitrifiable composition throughout the cross section of the column is substantially uniform. In this manner a greater uniformity in heating of the vitrifiable composition is achieved.

10 Claims, 4 Drawing Figures

PREHEATER FOR COMPACTED VITRIFIABLE MATERIAL

DESCRIPTION

1. Technical Field

The present invention is concerned with a preheater in the form of a column exchanger for preheating elements of a vitrifiable composition, such as balls, plaquettes, and so forth, which are compacted together, before introduction into a glass smelting furnace. The invention has particular utility in the manufacture of articles made of glass.

2. Background Art

It is known that the thermal efficiency of a glass smelting furnace may be improved if a considerable amount of heat from the hot gases rising from the furnace into regeneration chambers or recuperators is recovered. Through use of the residual heat of the hot gases rising from the regenerators or recuperators in the preheating of elements of a vitrifiable composition which are massed together before they are introduced into the smelting furnace, it is possible to realize a greater degree of efficiency.

Various kinds of column exchangers have been proposed for preheating the massed or conglomerated elements of the vitrifiable composition. For example, in one type of column exchanger the conglomerates fall freely inside the column in opposition to an upwardly moving flow of hot gases. It has been found, considering the efficiency of heat transfer, that the residence time of the conglomerates within the column and contact by the hot gases is an important factor. The resonance time and duration of contact of the conglomerates with hot gases can be extended by increasing the height of the column. However, it has been found that an increase in the height of the column results in an increase in the amount of heat lost, as well as an increase in the cost of manufacture of the column. Columns containing elements of packing which serve to slow the fall of the conglomerates of the vitrifiable composition have been proposed, also. However, columns containing elements of packing are subject to frequent clogging with the charge of vitrifiable composition. In another type of device with which the present invention is specifically concerned, a charge of a solid substance to be heated is introduced into the column. The charge is introduced at the top and removed at the bottom, and within the column the charge not only moves against a flow of hot gases but also is in heat exchange relation with the hot gases. In such a device, the homogeneity of the flow of hot gases throughout the interior of the column and the regularity of the entire charge from the inlet of the column to the outlet by the force of gravity constitute important factors both in the functioning capability and quality of the preheater.

It has been found that if no precautions are taken, the elements of the charge in the vicinity of the axis of the column descend more rapidly than those elements of the charge situated in the vicinity of the walls of the column. The result of a lack of regularity of flow of the elements of the charge results in nonuniformity in the heating of the elements of the charge product. This action possibly may result, at the points where the temperature is the highest, in fusion of certain elements or constituents of the charge. Ultimately, the result may be that of a clogging-up of the column. The clogging-up of the column may be in accordance with a self-accelerating process.

The object of the present invention is to provide a preheater in the form of a column exchanger for preheating the elements of a vitrifiable composition which are compacted or massed together, and which does not involve the above-mentioned disadvantages of the known preheaters.

SUMMARY OF THE INVENTION

The preheater of the invention is of the type which consists of a heat-insulated column in which the massed-together elements of the vitrifiable composition, hereinafter called "balls" are loaded into the column at the top. The balls, then, fall by the force of gravity through hot gases from the furnace which circulate upward, against the flow of balls due to the sucking action of a fan located at the high part of the column.

The object of the invention is to provide means for slowing the speed of descent of the balls moving through one column particularly in the area of its axis. Structure for slowing the descent of the balls through the column is in the form of a dihedral element mounted within the column. The dihedral element includes an edge which is located both in a horizontal plane and in the vertical plane of symmetry of the column. The edge of the dihedral element may be rotated toward the top of the column. The dihedral element, the wall of the column of the preheater and the sloping alignment of balls which takes shape under the dihedral element defines a mixing chamber which is connected with a regenerator or recuperator into which the hot gases from the smelting furnace circulate.

The balls located in the vicinity of the axis of the column, during descending movement, slide over the inclined faces of the dihedral element which serve to check their speed in comparison to the speed of movement of the balls in the areas near the walls of the column. The dihedral element serves to provide regularity in the speed of movement of the balls both at the center of the column along the axis and those within the region of the periphery of the column. Thus, the dihedral element functions in a manner to permit uniformity in the heating of the product because of the regularity in the speed of movement of the balls along the column to overcome problems of the prior art, namely that of a danger of overheating and fusion of certain constituents of the charge leading to a clogging up of the column. Also, whatever may be the state of the charge of the balls in the column, that is, whether it is full or empty or partially filled, there will be an energetic mixing of the flow or flows of hot gases, resulting in turbulence within approximately the region of a prismatic chamber defined by the faces of the dihedral element, the walls of the column and the upper surface of the sloping alignment of balls forming at the foot of the faces of the dihedral element. A uniform distribution of the flow of gases to all points in the column will take place. It is advantageous to equip the dihedral element with a device which makes it possible to vary the slope of the faces.

BRIEF DESCRIPTION OF THE DRAWING

An embodiment of the preheater of the invention will now be described, as a nonlimiting example, in combination with the annexed drawings, in which:

With reference to FIG. 1, a preheater 10 in the form of a column exchanger is illustrated. The column has an inlet for balls 12 of a vitrifiable composition located at the top. A transporter 14 is provided to convey balls to the inlet. The balls descend through the column, by the force of gravity, tranverse, successively, a charging hopper 16, a screen 22, an upper chamber 28, a central chamber 32, a lower chamber 34 and an outlet from which the balls exit the column to be deposited on a vibrating distributor 36.

Figure 1:
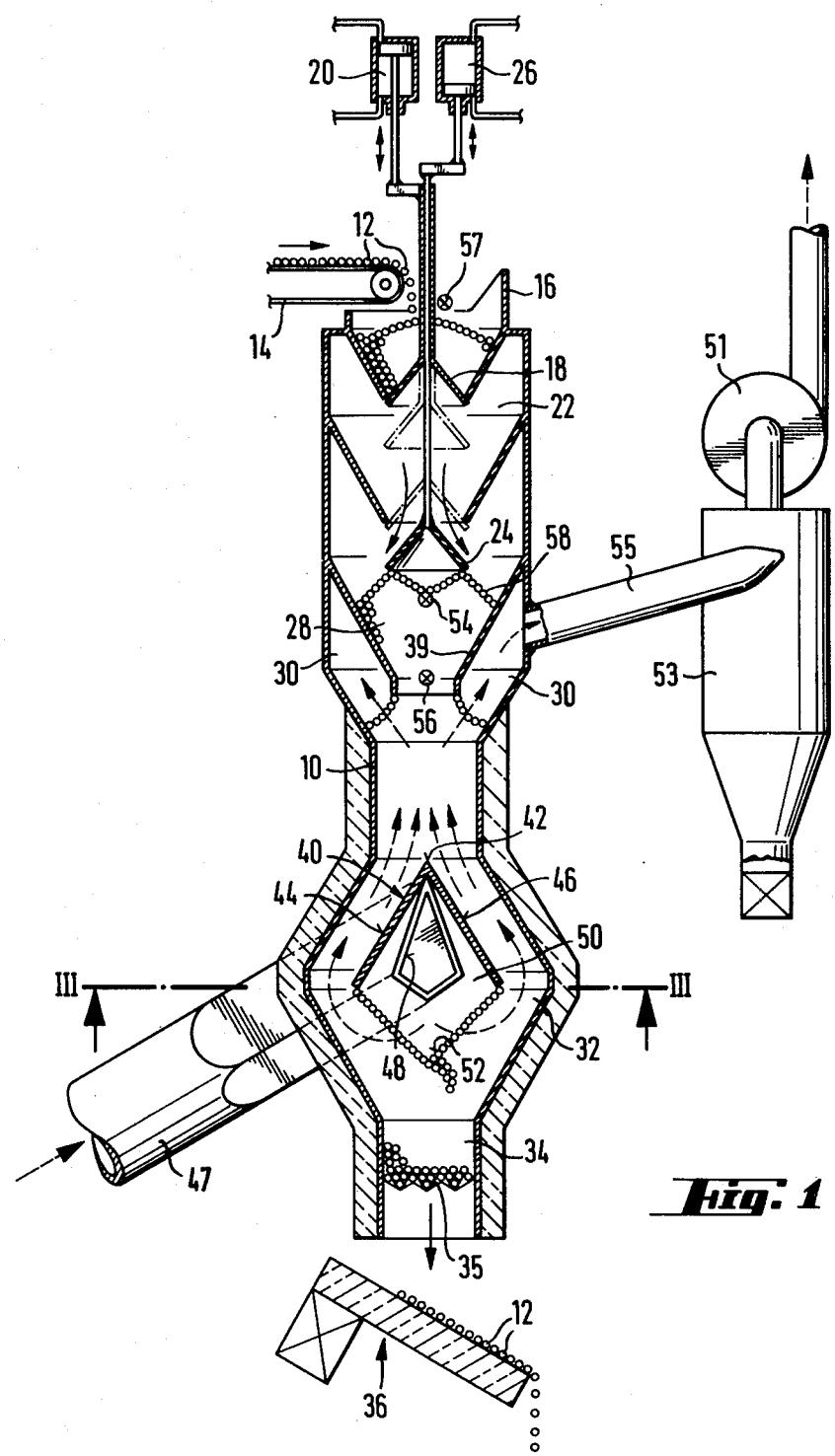
FIG. 1 is a view, partially in vertical section, of the preheater.

A damper 18 or some other form of closing structure is located at the lower part of the hopper. Means are provided for supporting a pair of plates of the damper whereby in an upper disposition of the damper the plates may seal the hopper. A control 20, such as a pneumatic control, hydraulic control or some other form of control is connected to the means supporting the plates of the damper for moving the damper from the position at which the plates seal the hopper (the full line position in FIG. 1) to a position at which the hopper is open (the dotted line position in FIG. 1).

A damper 24, similar to the damper 18, is provided for sealing the lower orifice of the screen 22. The damper is supported in a manner similar to the manner of support of damper 18 and by means of control 26 is movable between a position at which the orifice of screen 22 is sealed (the dotted line position in FIG. 1) and a position at which the orifice of the screen is open (the full line position in FIG. 1).

Apertures 30 in the form of ears which extend from the walls of the column are located within the region of the upper chamber to provide an escape of the gases cooled by heat exchange with the descending balls.

As may be seen in FIG. 1, the central chamber 32 is provided with an enlarged section, whereas the lower chamber 34 is reduced in section thereby being substantially equal to that of the upper chamber 28. Closing means which may consist of an extractor with flaps 35 are disposed within the reduced section of the lower chamber. The flaps are adjustable to and from positions at which the flaps seal the lower chamber and at which the flaps maintain the lower chamber open thereby to regulate the flow of the balls. It is advantageous for the flaps to be activated by an oscillating movement through any particular angle of adjustment, at any particular time and for any particular duration of time. The amplitude and frequency of the oscillating movement is controlled at the level of the glass-smelting furnace to be fed. As indicated, the balls, following passage through the flaps of the extractor, will locate to the vibrating distributor 36.

The vibrating distributor 36 may be replaced by a heated, rotating tube described in French Pat. No. 1,477,690 to the present applicant. To this end, the balls may undergo a supplementary heating in the tube, without adhering. Thus, in conformity with that teaching it is possible to accomplish a good part of the reactions involved in the decarbonation of the charge outside of the smelting furnace.

A deflector element 39 having downwardly directed walls generally in the form of a funnel shaped, truncated cone provide an upper wall for the apertures 30. The walls of the deflector element are installed in the upper chamber 28 in such a way to maintain the apertures completely open. The walls of the column below the apertures 30 including the walls of the central and lower chambers are heat-insulated.

According to the invention, the dihedral element 40 is disposed within the region of the enlarged section of central chamber 42. As indicated, the edge 32 of the dihedral element is arranged both in a horizontal plane and in the vertical plane of symmetry of the column. The edge 42 of the dihedral element is rotated toward the top of the column to locate the faces 44, 46, both of which are inclined downward, in positions of symmetry with respect to the vertical plane. The faces may be capable of undergoing a certain amount of movement in adjustment for the purpose of regulating the flow of the balls in the enlarged section of the column during operation of the preheater, if correction is required. A pair of tubes 47, 49, connected at one end to a recuperator or a regenerator (not shown) and at the other end to openings 48 of the dihedral element 40, provide a path of flow of the hot gases from the recuperator or regenerator into the interior of a prismatic mixing chamber 50. The mixing chamber, more particularly, is defined by the faces 44, 46 of the dihedral element and the upper surface 52 of the sloping alignment of balls which form under the dihedral element. The column, within the region between the apertures 30 and the openings 48 is maintained under a condition of partial vacuum. To this end, the preheater includes an exhaust fan 51 which is connected with the apertures by a cyclone separator 53 and a discharge conduit 55.

Figure 3:
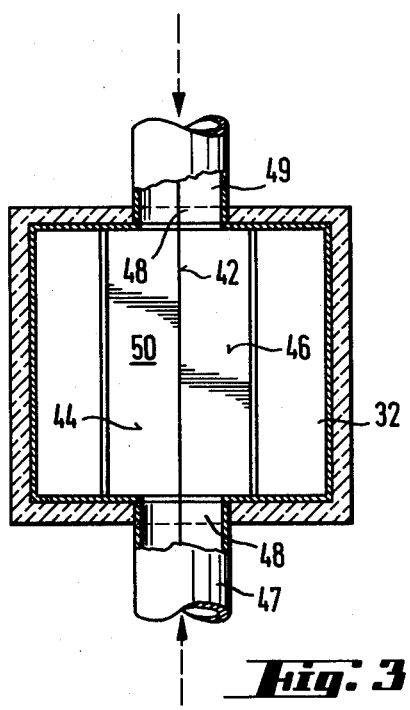
FIG. 3 is a section as seen along the line III—III of FIG. 1.

FIG. 3 illustrates the section through the central chamber 32 as being of rectangular outline. With a section of that outline it is possible to avoid the formation of dead areas in the form of spots within which the balls have a tendency to become immobilized.

Figure 4:
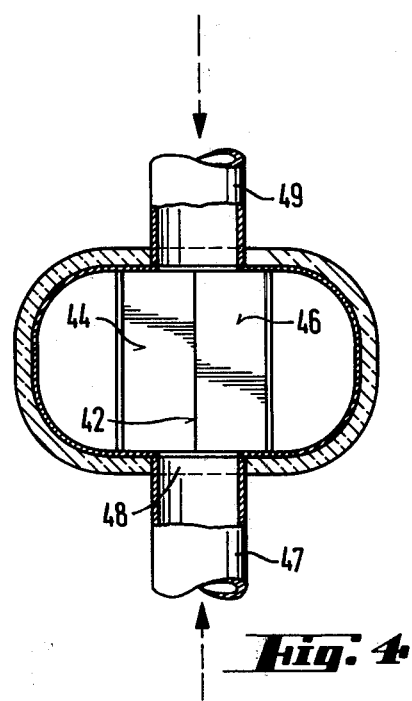
FIG. 4 is a view, similar to that of FIG. 3, illustrating a further embodiment of the preheater.

FIG. 4 illustrates a variant in the outline of the central chamber 32 which is preferred for its dimensional stability. The central chamber is formed by a pair of outer semicircular walls connected to a generally rectangular central column portion.

A first and second detector 54, 56 are provided for automatic regulation of the amount of charge of balls 12 to the column. Both detectors are located in the upper chamber 28 of the column. Particularly, the detectors are disposed at different locations along the axis of the column which correspond to and determine, respectively, both the maximum and minimum levels of balls within the upper chamber. FIG. 1 illustrates the top of the alignment 58 of balls located within the region of the maximum level detector 54. The top of the alignment, also, is in the region of the damper 24 which may be completely open without being obstructed by the balls. The top of the alignment of balls at the minimum level will locate substantially at the level of the lower end of the deflector element 39. The maximum and minimum level detectors function in a manner and in response to the sensing of the top of the alignment 58 of balls to command conveyor 14 to stop and to, once again, commence operation in the movement of balls to the charging hopper 16 of preheater 10. Particularly, detector 54, the maximum level detector commands the conveyor 14 to stop and detector 56, the minimum level detector, commands the conveyor to commence operation. Simultaneously with the command that the conveyor stop, the detector sends a command to close damper 24 and open damper 18. This condition is illustrated by the dotted line disposition of the dampers in FIG 1. When the top of the alignment 58 of balls falls to the level of detector 56, the detector not only commands the conveyor 14 to again commence operation, but also simultaneously commands the dampers 18, 24 to move to the full line position in FIG. 1. A detector 57 is also disposed in the charging hopper 16 to provide additional control of the operation of the conveyor 14. The flaps 35 of the extractor may be similarly controlled thereby to automatically regulate the opening in accordance with the level of the glass in the furnace.

The preheater 10 functions in a manner, as follows: when the top of the alignment 58 of balls reaches the level of the detector 54, the detector immediately commands that the damper 24 close and that the conveyor 14 discontinue operation. The position of the flaps 35 of the extractor thereby to regulate the opening is under control of the furnace. Since the entry for the flow of the balls to the upper chamber 28 is closed the level of the balls in the upper chamber will drop until such time as the top of the alignment 58 of balls reaches the level of the detector 56. The detector then commands the damper 24 to open and, simultaneously, commands conveyor 14 to again commence operation. In this way, the preheater is constantly being filled with balls and the preheating can then be accomplished continuously.

As was stated above, the balls which move through the column in the vicinity of the axis of the preheater have their speed checked in comparison with the speed of the balls adjacent to and in the vicinity of the lateral walls of the column. To this end, the speed of movement of the balls along the axis of the column is checked through sliding action of the balls on the faces 44, 46 of the dihedral element 40. By selecting the proper angle at the top of the dihedral element it is possible to regulate the speed of descent of the balls within the column so that all balls travel at an approximately uniform speed throughout the interior of the preheater. Hot gases from the recuperator or the regenerator are communicated by way of tubes 47, 49 to enter the preheater through the openings 48. The pressure of the hot gases is slightly greater than atmospheric pressure, or equal to atmospheric pressure. In this manner, it is possible to prevent the introduction of cold air through the lower chamber of the column. The gases are mixed in the prismatic chamber 50 and then drawn to the apertures 30 because of a negative pressure created by the exhaust fan 51, acting through the cyclone separator 53. As the hot gases ascend within the column, in heat transfer relation with the balls moving substantially in counterflow, it gives up a large part of its heat so that it is practically cooled when the gases emerge from the column.

Figure 2:
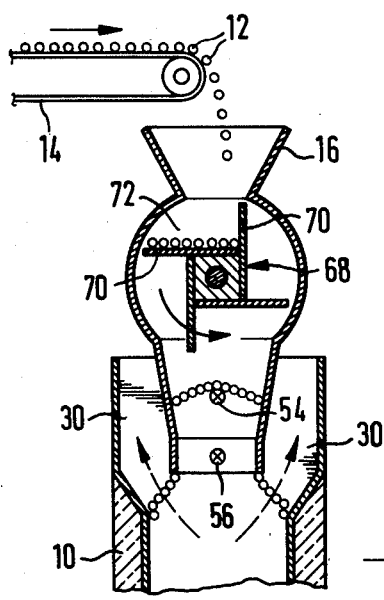
FIG. 2 illustrates a variant of means for introducing elements of a vitrifiable composition into the preheater.

The embodiment of FIG. 2 illustrates a rotating distributor 68 driven in rotation by the balls which are conveyed by conveyor 14 to the charging hopper 16. The rotating distributor of the embodiment of FIG. 2 functions in a manner which may be likened to the operation of screen 22 and damper 24 to provide a flow of balls 12 to the upper chamber 28. For this purpose, the distributor 68 includes a plurality of blades 70 arranged to provide a number of bucket-like containers 72. As illustrated, the blades are staggered with respect to the radial direction in such a way that when one of the containers locates under the charging hopper 16, one of its blades is vertical to comprise approximately a prolongation of the wall of the hopper. The other blade of the container is disposed horizontally and as a charge of balls falls onto the horizontal blade the distributor is imparted a rotational movement about an axis which is perpendicular to the longitudinal axis of the column.

I claim:

1. A preheater for preheating massed-together, vitrifiable material which may be in the form of balls prior to introduction into a glass-smelting furnace, said preheater comprising a column having a flow path within the region of a heat-insulated wall between an inlet and an outlet, said column arranged substantially in a vertical plane and said material being loaded into said column through the inlet at the top thereby to fall by the force of gravity substantially in counterflow to the flow of hot gases coming from the furnace circulating upward under action of a fan disposed within the upper region of the column whose low pressure side is in communication with said flow path, characterized in that the flow path of the column substantially constant in cross section includes a central chamber with an enlarged section, a dihedral element having an edge, means for mounting said dihedral element so that said edge is arranged horizontally, in a vertical plane of symmetry of the column and rotated toward the inlet at the top of the column whereby said dihedral element, the wall of the column and a sloping alignment of balls which forms under said dihedral element defines a mixing chamber, said mixing chamber connected with a regenerator for the hot gases from the glass-furnace, and adjustable closing means at said outlet of said column.

2. The preheater as claimed in claim 1 wherein said dihedral includes a pair of faces which extend to said edge, each of the faces capable of being moved around said edge thereby to regulate and make substantially uniform the flow of balls in the enlarged section of the column.

3. The preheater as claimed in claim 1 wherein said central chamber has a rectangular, transverse section.

4. The preheater as claimed in claim 1 wherein said central chamber has a transverse chamber in the form of two semicircles joined with the ends of a rectangle.

5. The preheater claimed in claim 1 further characterized by a conveyor device for feeding the glass-smelting furnace, said conveyor device located below thereby to receive preheated balls from said outlet of said column, and wherein said adjustable closing means comprises an extractor having oscillating flaps within said outlet movable between positions to open and close and partially open said outlet, wherein the amplitude and frequency of movement of said flaps from a closed position are controlled at the level of the glass-furnace to be fed.

6. The preheater claimed in claim 1 further characterized by a lock chamber for the introduction of said balls being formed by a screen disposed within the region at the top of the column adapted to receive balls from a source, said balls being placed in reserve, means for closing said screen to prevent balls from said reserve to move into an upper chamber of said column, and means for detection and control of a level of balls within said upper chamber, said detection and control means comprising a first and second detector, each disposed generally along the vertical axis of said column, said first detector being provided to control the closing of the screen as soon as the level of balls in the column passes a first predetermined level, and said second detector being provided to control the opening of the screen as soon as the level of balls drops from said first predetermined level to a second predetermined level.

7. The preheater claimed in claim 1 further including by a rotating distributor disposed at the top of the column, said rotating distributor including a plurality of blades each arranged laterally of one another to define bucket-like containers between each adjacent pair of blades, characterized in that the blades are oriented differently with respect to the radial direction in such a way that when a container presents itself under the inlet, one of the blades is vertical and provides approximately a prolongation of a wall of the inlet.

8. The preheater claimed in claim 5 wherein the conveyor device is a vibrating conveyor.

9. The preheater as claimed in claim 5 wherein the conveyor device has a heated, rotating tube capable of bringing the balls to a temperature level corresponding to the decarbonation reactions of the vitrifiable materials.

10. The preheater as claimed in claim 1 characterized in that the pressure of the hot gas on a level with the openings leading under the dihedral element is at least equal to atmospheric pressure.

* * * * *